Patented May 21, 1940

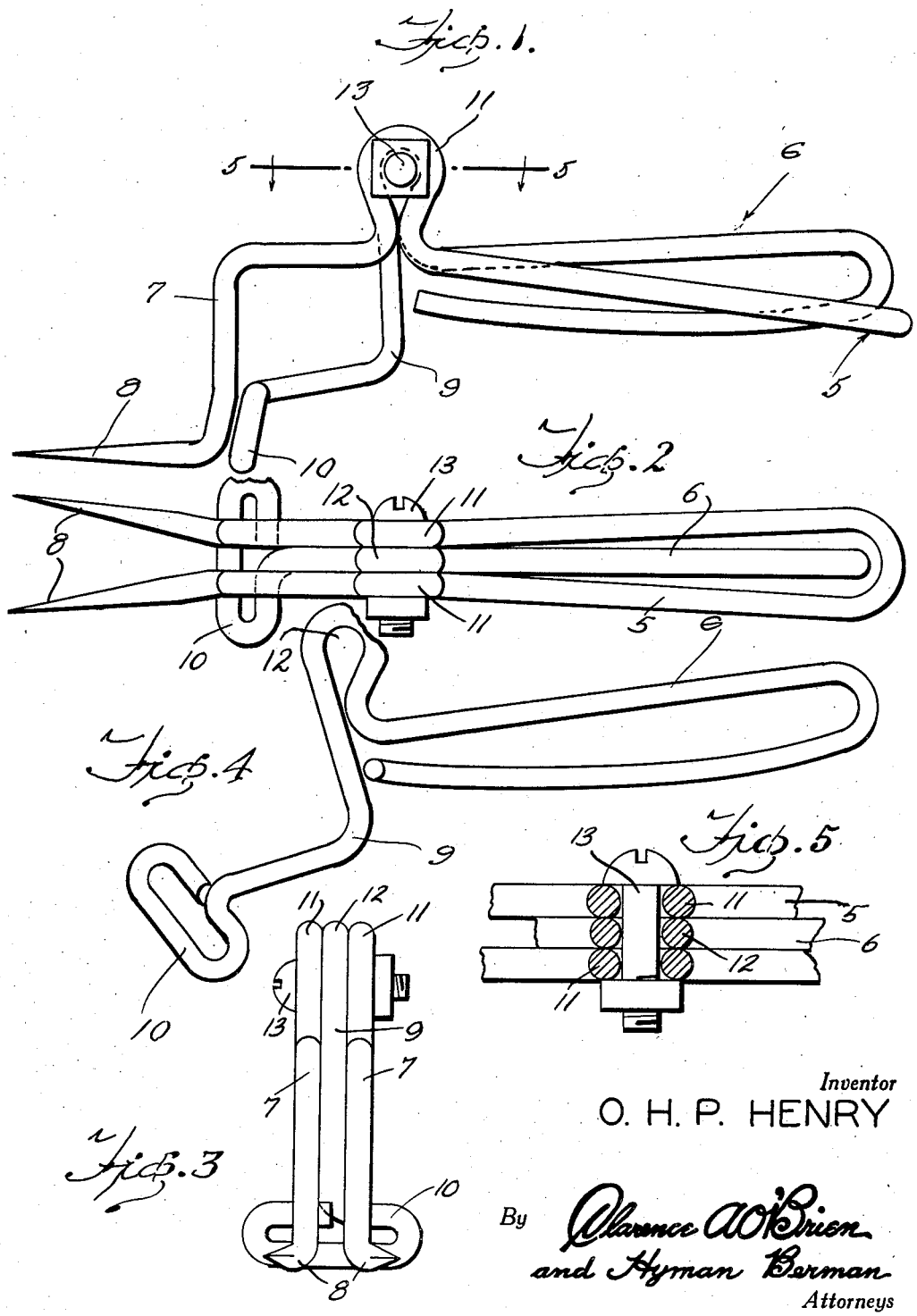

2,201,727

UNITED STATES PATENT OFFICE 2,201,727

TONGS

Oliver H. P. Henry, Sullivan, Ill.

Application October 13, 1938, Serial No. 234,829
Renewed February 14, 1940

1 Claim. (Cl. 294—3)

This invention relates to improvements in tongs and an object of the invention is to provide tongs capable of various purposes, the tongs being so constructed or fashioned so as to serve with equal facility as a pot, pan, or stove lid lifter, a fork, and in various other capacities which will readily present themselves to the user.

The invention together with its objects and advantages will be best understood from a study of the following description taken in connection with the accompanying drawing wherein:

Figure 1 is a side elevational view of the tongs.

Figure 2 is a top plan view thereof.

Figure 3 is an end elevational view of the tongs.

Figure 4 is a perspective view of one of the pivoted elements of the tongs, and

Figure 5 is a sectional view taken substantially on the line 5—5 of Figure 1.

Referring more in detail to the drawing it will be seen that in the preferred embodiment thereof the tongs comprise a pair of handle members 5 and 6.

The handle member 5 is preferably formed from a single length of wire bent to provide a substantially U-shaped handle the sides of which terminate in jaws 7 that in turn merge into sharpened pointed tines 8. The jaws 7 extend substantially at right angles to the plane of the handle 5 and the tines 8 extend longitudinally, substantially, with respect to the length of the handle and at substantially right angles to the jaws 7 as shown.

The handle member 6 is also formed from a single length of wire bent to provide a substantially elongated loop-shaped handle proper that is accommodated between the sides of the handle 5, and the handle 6 at one end thereof merges into a substantially L-shaped shank 9 that in turn terminates in a loop-shaped jaw 10 that is complemental to the jaws 7 and extends substantially transversely to the length of the jaws 7 to bridge the space therebetween.

The handle 5 adjacent the jaw-equipped end thereof has the sides thereof looped to provide bearings 11 while the handle 6 at the point of juncture thereof with the shank 9 is also formed to provide an eye or bearing 12 complemental to the eyes or bearings 11.

The bearing eyes 11 and 12 accommodate, as shown, a nut-equipped bolt 13 through the medium of which the handle members 5 and 6 are pivotally connected together.

Manifestly in actual practice jaws 7 and 10 will cooperate for clamping therebetween the rim of a pan, pot, or the like so that the device may be used with facility as a detachable pan or pot handle when desired.

Also, when it is desired to use the device somewhat in the nature of a fork the tines 8 are brought into use. Tines 8 may also be used for engaging the aperatures in a stove lid when the device is to be used as a stove lid lifter.

It is thought that a clear understanding of the construction, utility and advantages of tongs embodying the features of the present invention will be had without a more detailed description.

Having thus described the invention what is claimed as new is:

A device of the class described comprising a pair of members, one member being of substantially U-shape to provide a pair of spaced limbs, the outer end of each limb being bent twice at right angles to provide a depending portion and an outwardly extending portion, said outwardly extending portions being pointed to form tines, and each limb being bent, adjacent the bent end to form an upstanding loop, the second member being of substantially U-shape with one limb longer than the other and said long limb being bent to form an upstanding loop, the forward limb of the loop extending downwardly beyond the short limb of the second member and then bent outwardly at right angles to provide a forwardly extending portion, the free end of which is bent into a transverse loop which is located adjacent the inner ends of the tines, when the device is closed, and a pivot bolt passing through the three loops formed on the two limbs of the first member and the long limb of the second member, the second member fitting between the limbs of the first member with the limbs of the second member arranged in a plane at right angles to the limbs of the first member.

OLIVER H. P. HENRY.